Oct. 16, 1928.  
B. E. BEYER  
1,688,068  
GLASS BEVELING MACHINE  
Filed Aug. 19, 1925    4 Sheets-Sheet 4
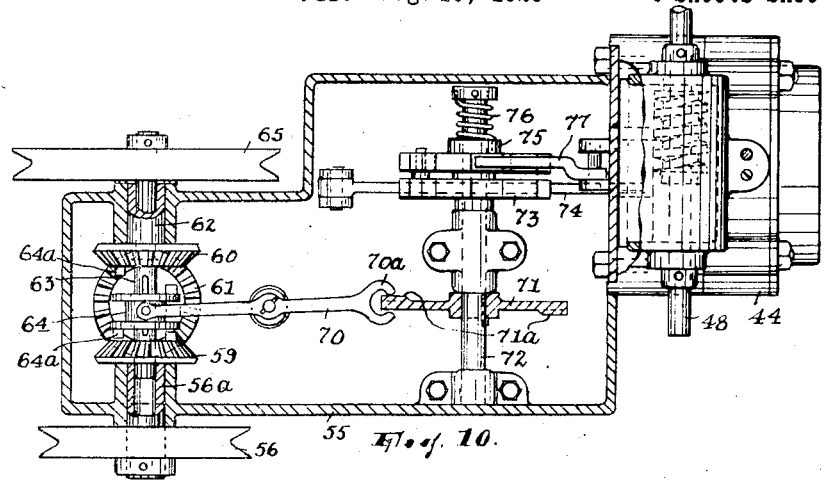
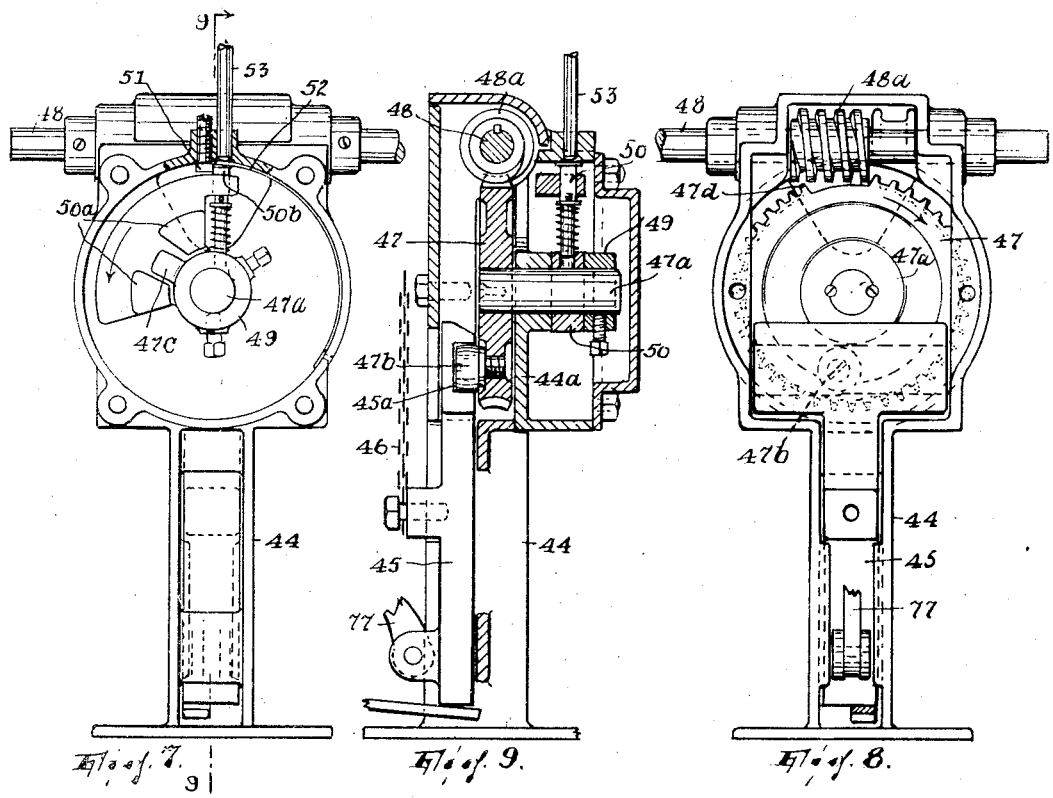
WITNESS  
INVENTOR,  
Bertrand E. Beyer,  
BY  
ATTORNEY Patented Oct. 16, 1928.

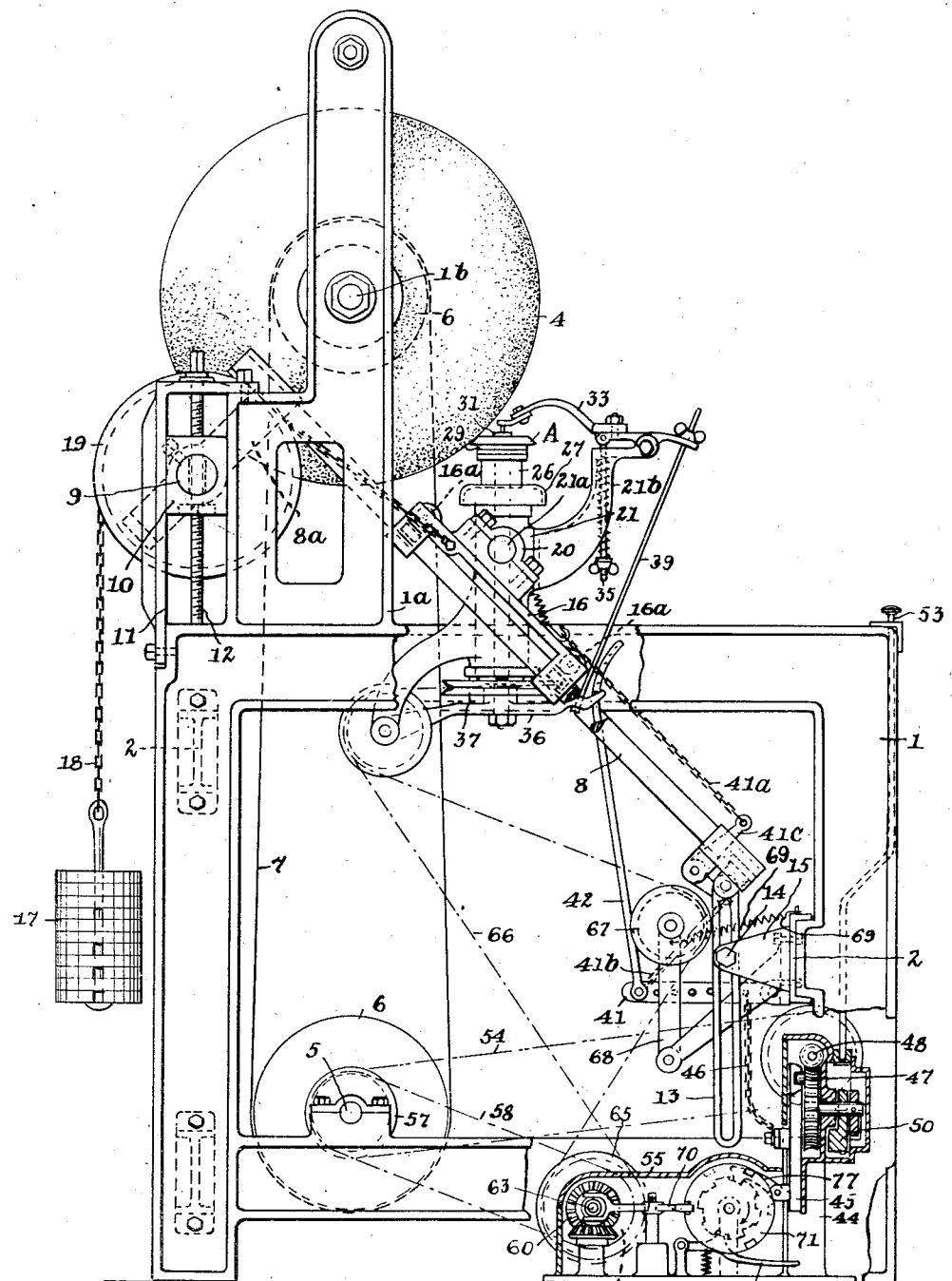

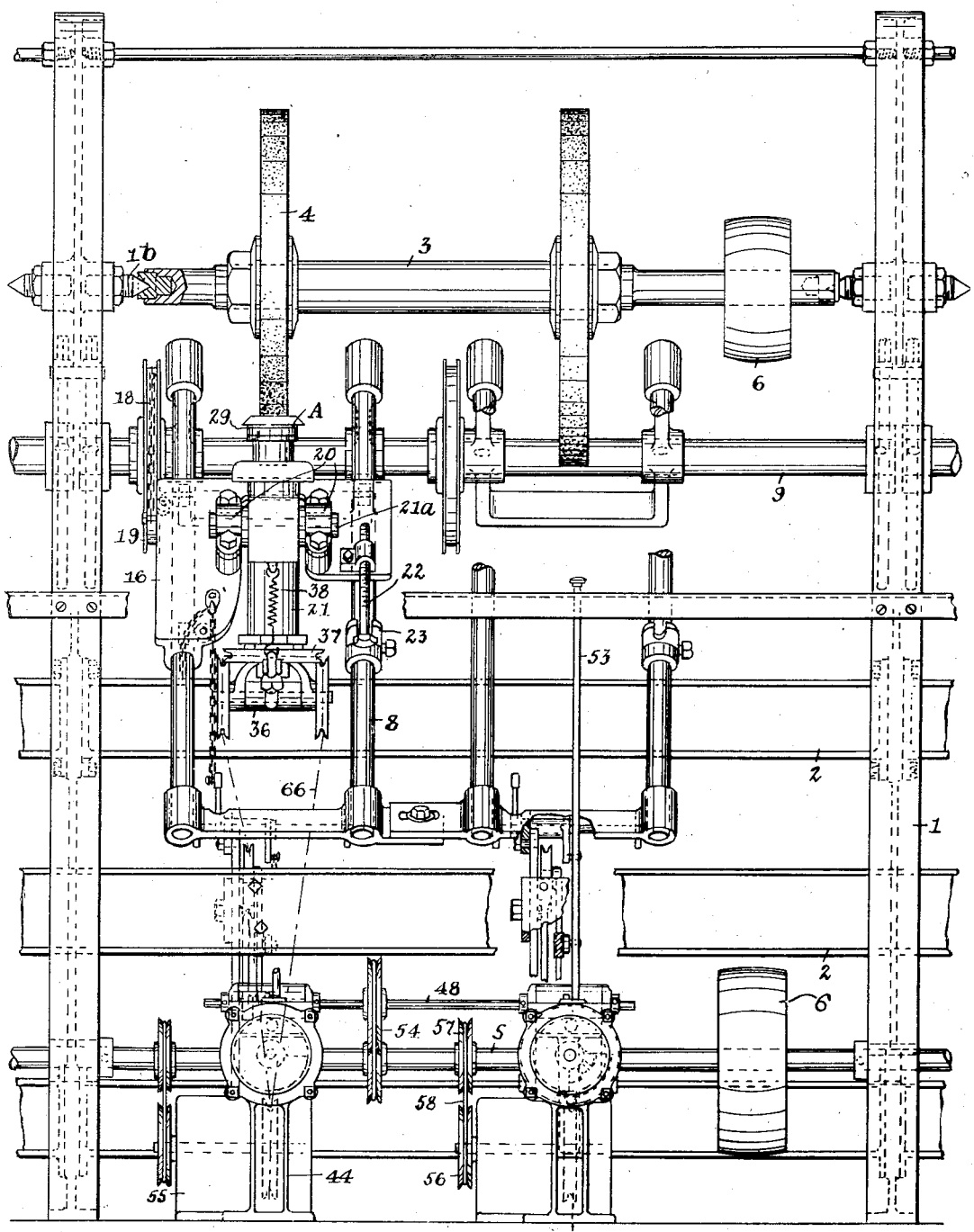

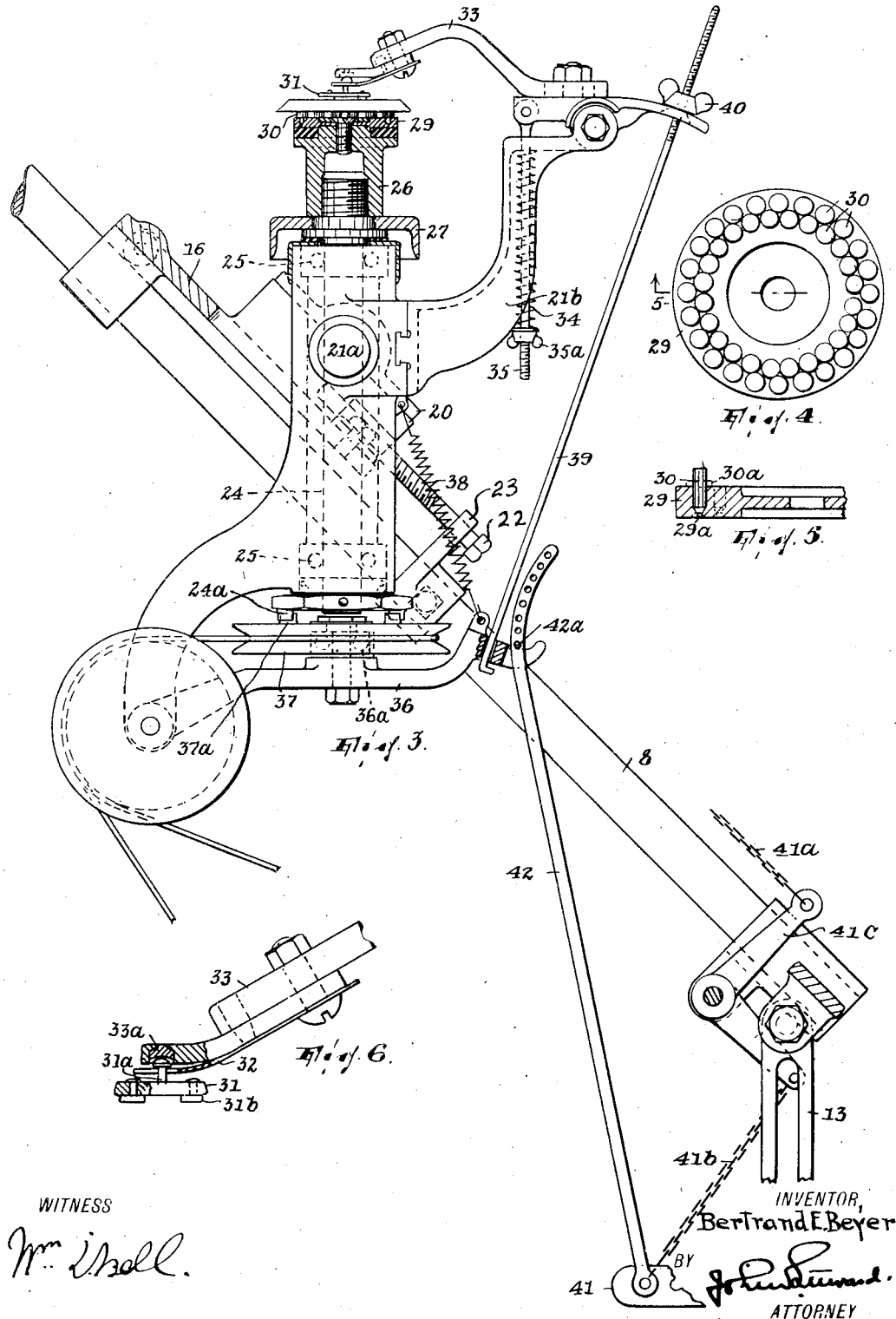

1,688,068

UNITED STATES PATENT OFFICE.

BERTRAND E. BEYER, OF PATERSON, NEW JERSEY, ASSIGNOR TO AMERICAN BEVEL GLASS COMPANY, OF PATERSON, NEW JERSEY, A CORPORATION OF NEW JERSEY.

GLASS-BEVELING MACHINE.

Application filed August 19, 1925. Serial No. 51,194.

This invention relates to machines for grinding, as in beveling, glass and other objects and as herein set forth it is applied to machines for beveling the entire periphery of a glass object whose margin is of some rounded form so that the object is rotated in its own plane so as to progressively subject its margin to the beveling action. The principal objects of the invention are to increase output, lower the degree of skill necessary to operate machines of this character, improve the work-holding means, increase the efficiency and durability of such machines, and reduce the amount of attention necessary to keep the machine in proper working order.

To facilitate an understanding of the construction and operation of that example of the machine herein presented the following may be noted: The beveling wheel rotates constantly. The work carriage is forced relatively toward the wheel by some force, as a weight, but upon completion of its working thrust it is automatically drawn back and reset in a locked position, where it remains until the operator effects release thereof after removal of the already-beveled object and substitution of the blank to be next operated upon; each time the carriage performs its working thrust it encounters a stop which determines the extent of the beveling, and thereupon, on the carriage beginning to return, the rotation of the holder for the object or "work" is stopped and next the work, which is clamped by the work holder, is released to permit removal by the operator of the finished piece and the substitution of the fresh piece or blank. There is, further, provision for rotating the work holder first one way and then the other so that the wear on the beveling wheel will be equalized and "fire-marks" on the work prevented.

In the drawings,

Fig. 1 is a side elevation, partly in section, of the improved beveling machine;

Fig. 2 is a front elevation on a larger scale, certain parts being removed;

Fig. 3 is a side elevation, partly in section, illustrating mainly the work-holder;

Fig. 4 is a plan of the plateau of the work-holder, and Fig. 5 a fragmentary section thereof on line 5—5 of Fig. 4;

Fig. 6 is a side elevation, partly in section, of the work-holder toupee and its carrying arm;

Figs. 7 and 8 are opposite side elevations of the controlling mechanism and Fig. 9 a vertical section thereof on line 9—9, Fig. 7; and Fig. 10 is a horizontal sectional view of the work-holder reversing mechanism.

As shown by Fig. 2 the machines will usually be built in a row with a common frame, each operator attending a single section or machine. The main frame for each machine may be said to comprise two side frames 1 connected by suitable rails 2 and other parts to be described, each side frame having a rear upright $1^a$. These uprights afford bearings $1^b$ for a horizontal shaft 3 which carries the beveling wheel 4 and which is constantly rotated from the drive shaft 5 through pulleys 6 and a belt 7. In the main frame is an adjustable frame 8 supported by independently adjustable means as follows: At its upper end it has underneath legs $8^a$ fulcrumed on a shaft 9 which is mounted at its ends in blocks 10 arranged to slide in vertical guides 11 formed in the uprights $1^a$ and adjustable vertically by turning screws 12 swivelled in the uprights and tapped into the blocks. At its lower end the frame 8 has a depending pivoted sloted leg 13 receiving a clamping bolt 14 in a bracket 15 projecting from the lower forward rail 2. The frame 8 is thus adjustable to various inclinations.

On the frame 8 slides a carriage 16, having anti-friction rollers $16^a$ which is normally urged upwardly by a weight 17 connected with the upper end of the carriage by a chain 18 extending over a pulley 19 journaled on shaft 9. In clamps 20 in this carriage are held the trunnions $21^a$ of a bearing head 21 for the work-holder; by manipulating the clamps, which normally hold the bearing head in fixed relation to the carriage, the bearing head may be fixed in any desired angular relation to the carriage and hence to the frame 8. (There are thus possible a primary adjustment, with respect to frame 8, and a secondary adjustment, with respect to the bearing-head.) The bearing-head has a projecting arm $21^b$. The extent of upward movement of the carriage is limited and may be varied by an adjusting screw 22 tapped thereinto and having its head adapted to contact with a fork 23 fixed to the frame 8.

The work-holder includes a spindle 24 revoluble in the bearing-head in ball-bearings 25, the lower end portion of the spindle forming one member $24^a$ of a clutch. On the upper end of the spindle is screwed (so as to be removable) a plateau head 26, which incidentally clamps between itself and a suitable abutment on the spindle an inverted cup 27 designed to deflect the water used in the beveling operation away from the adjacent ball-bearing 25. On the top of the plateau head is secured the plateau 29 of novel type; it consists of a metal disk having plugs 30 set therein preferably in concentric circular arrangement. These plugs I prefer to form of animal hide, as raw-hide, which affords the superior grip on the work characteristic of clean rubber without having the disadvantage attending the use of rubber, to wit, its tendency to become filmed with oil (due to the presence of oil on the glass blanks supplied), which causes adhesion of glass scratching particles; apparently by osmotic action the oil is carried away from the acting or gripping surfaces of the plugs when formed of porous tissue, like animal hide. The plugs may have their upper ends upset, either by a special operation or as the result of the pressure in use (see at 30ª in Fig. 5), which increases their gripping effect. The holes in the disk 29 which receive the plugs have vents 29ª extending to the under face of the disk. Another part of the work-holder is the toupee 31 which is a disk having a central headed spindle 31ª and fitted with animal hide plugs 31ᵇ, fewer in number than but otherwise the same as the plugs 30. This toupee is freely revoluble, having its spindle removably held in the fork of a spring clamp 32 which normally holds the head of the spindle against a bearing 33ª in a lever 33 pivoted in arm 21ᵇ on a horizontal axis, the working arm of the lever being subjected to the pressure of a spring 34 (so as to hold the toupee against the work) which is coiled between arm 21ᵇ and a nut 35ª screwed on a threaded rod 35 pivoted to the lever and penetrating said arm.

Pivoted in the bearing-head 21 is a bracket 36 which supports a pulley 37 revoluble on a bearing 36ª on the bracket and forming at 37ª a clutch-member coactive with the clutch member 24ª when the bracket is elevated, which it normally is by the tension of a spring 38. The bracket is connected with the free or forward arm of the lever 33 by a link 39 having its lower end passing freely through the bracket and bent off and its upper end threaded and penetrated by the lever 33 and provided with an adjusting nut 40. Lost-motion is afforded in this connection for a purpose to be stated.

There is a lever 41 from which the carriage is pulled down and the bracket 36 depressed through the following connections: A flexible connection for pulling down the carriage, consisting of the chains 41ª and 41ᵇ and the bell-crank lever 41ᶜ, such connection connecting the lever and carriage; and the link 42 pivoted to the lever and engaged in the fork of the bracket 36 and having a series of holes in its upper end to receive a pin 42ª seated on the fork. When the lever moves down it first causes downward movement of the carriage and near the conclusion of such movement the bracket is depressed, first to disestablish the clutch and stop rotation of the work and then (on account of the mentioned lost-motion) to shift lever 33 and release the work. The lever moves from its depressed position, where it is held at rest, up and back, and this is accomplished as follows:

44 is a suitable casing mounted on the floor and forming a guide for a vertically movable gravity-actuated T-shaped slide 45 which is connected with the lever 41 by a chain 46. This slide has a transverse groove 45ª receiving the roller on a rotary member which is caused to perform a single rotation and come to a stop, with the roller and consequently the slide and lever depressed. This rotary member is the worm-wheel 47 whose shaft 47ª is journaled in a wall 44ª of the casing, 47ᵇ being the mentioned roller thereon. This worm-wheel is driven by a worm 48ª on the constantly driven rotary shaft 48, and it is mutilated to the extent of having a few teeth absent so that each time it completes a revolution the worm-wheel will cease to drive it and it will come to a stop. Between a collar 49 fixed on the shaft 47ª and the wall 44ª a rotary hammer 50 is fulcrumed on the shaft, it having limited rotary movement relatively to the worm-wheel by receiving between two lugs 50ª thereof a lug 47ᶜ on the collar 49. When the worm-wheel comes to a stop due to the mentioned mutilation thereof (roller 47ᵇ being then down) this hammer has been carried by the worm-wheel rotatively over the shaft 48 to a position where it is held against falling the distance represented between the relatively upper lug 50ª and lug 47ᶜ in Fig. 7 (so that energy is stored therein) by detent means consisting of a fixed stop 51 in the casing and a repressible spring-pressed stop 50ᵇ in the hammer, which latter comes in contact with the former on the worm-wheel coming to a stop. If now the stop 50ᵇ be repressed to clear stop 51 the hammer will fall by gravity and by impact against the lower lug 50ª will turn the worm-wheel sufficiently to bring its tooth 47ᵇ in Fig. 8 into engagement with the worm, which will then cause another cycle of operation of the parts, leaving them at standstill the same as before. The stop 50ᵇ in its position of engagement with stop 51 is opposed by a plate-spring 52 in turn adapted to be depressed by a push-rod 53 terminating in a knob in convenient reach of the operator at the front of the machine. The worm-shaft 48 is rotated from the drive shaft 5 by a belt-and-pulley system 54 shown in Figs. 1 and 2.

The work-holder driving pulley 37 is constantly driven from the drive-shaft, preferably by mechanism which at intervals causes reversal of the direction of drive as in Figs. 1, 2 and 10.

In a suitable stand 55 projecting rearwardly from casing 44 is journaled the tubular hub 56ª of a pulley 56 which is connected with a pulley 57 on drive-shaft 5 by a belt 58. Hub 56ª has fixed thereon a bevel pinion 59 geared by an intermediate bevel pinion 61 with a bevel pinion 60 formed on the tubular hub 62 so that 59 and 60 rotate reversely. The hubs 56ª and 62 afford bearings for a shaft 63 on which is splined a clutch 64 having pins 64ª for clutch-engagement with either of these bevel wheels 59 and 60, so as to rotate the shaft one way or the other. The shaft carries a pulley 65 which is connected with pulley 37 by a belt 66, which may be incidentally kept taut by an idler pulley 67 journaled in a lever 68 subject to the pull of a spring 69. Shifting of the clutch 64 is effected by a lever 70 having a forked end 70ª receiving the periphery of a cam 71 having cam rises 71ª alternated on its lateral faces and forming with shaft 72 and a notched stop-wheel 73 thereon an intermittently rotated element which must perform quick partial revolutions so that the clutch 64 will be shifted quickly, wherefore this element is a part of the following escapement mechanism: The stop-wheel 73 is normally engaged and held by a spring-actuated holding pawl 74 in position to be disengaged from the stop-wheel by the slide 45 when it descends. On the shaft 72 is a pick-wheel 75 revoluble thereon subject to the resistance of a spiral spring 76 connecting the pick-wheel with the shaft, about which it is coiled. The peripheral notches in the pick-wheel are engageable successively by a pawl 77 pivoted to slide 45. Whenever the slide descends pawl 77 by turning the pick-wheel first tensions the spring, so that the shaft tends to turn in the direction of the arrow in Fig. 1 and then the slide disengages the holding pawl, so that the mentioned rotary element turns far enough to relax the spring; each step of advance thus assumed by said element is equal to the distance between two cam rises 71ª, wherefore shifting of lever 70 and hence of clutch 64 and the reversal of the direction of the work occur. When the slide rises pawl 74 reengages said element (to wit, the stop-wheel) and pawl 77 is shifted to engage with the next notch in the pick-wheel.

Operation: Assume what I term the controlling mechanism shown by Figs. 7 to 9 is holding the carriage depressed, with the bracket 36 also depressed and lever 33 elevated. The beveling or grinding wheel 4 is being (constantly) driven from the drive shaft 5, but the work-holder is now at standstill and the work-clamping means (plateau and toupee) are "open" to receive the work. The attendant now places a blank to be beveled on the plateau, whereupon the push-rod 53 is depressed. This releases the hammer 50 which in the way described shifts the worm-wheel into mesh with the worm 48ª so as to cause a complete rotation of the former and automatically bring it again to a stop. During the rise of the slide 45 (first half-revolution of the worm-wheel) the carriage is drawn upward by its weight 17, but before the work A engages the wheel 4 the toupee descends and coacts with the plateau to clamp the work and then the pulley 37 is clutched with and rotates the work-holder and work. The grinding (beveling) now proceeds and continues until limited by the stop 22; after contact of the work with the wheel the connection 46—41—41ᵇ—41ᶜ—41ª slackens to permit lost motion of slide 45 with respect to the carriage 16. During the second half of the revolution of the worm-wheel the carriage is withdrawn to clear the work from the wheel 4 and near the end of such movement the pulley is declutched from the work-holder and the toupee moved clear of the work so that the latter may be removed. The operator's duty, therefore, consists simply in placing the work in position, pressing the push-rod to start the operation and removing the finished work. If the push-rod were held depressed the operation would of course proceed without variable pause.

It is of advantage that a beveling machine should be constructed so that the line of pressure of the work on the grinding wheel's periphery can be made substantially coincident with a radius of the wheel for any degree of bevel chosen, for then whatever extent of change in diameter of the wheel occurs (as by wear) does not result in altering the angle of bevel, as would be the case if the line of pressure coincided with a chord of the wheel. It will be seen that if the guiding plane (of frame 8) for the working-holding means were adjustable about the wheel's axis as a pivot, with the work-holder pivotally adjustable on an axis parallel with such axis, this advantage could be effected, but not without some sacrifice, as of perfectly free access to the work. Therefore I preferably provide for supporting the guiding frame 8 so that it may be adjusted crosswise of its guiding plane at points spaced from each other lengthwise of such plane and as to each point independently of the other, whereby adjustments of the frame and work-holder to obtain the desired angle of bevel and maintain it whatever change occurs in the wheel's diameter may be effected and yet the work (whose pressure line is in a radius of the wheel) stands clear and always accessible, the frame itself being in some chord of the wheel.

When the work is circular and is rotated the periphery of the grinding wheel tends to become worn away as a groove whose cross-section is concave to the same arc as the periphery of the work. This means contact of the work with the wheel for more or less of the full width of the groove, whereas perfect glass grinding (without what are known as "fire-marks" on the work) is best obtained when the groove has a somewhat greater arc than that of the work; wherefore, to cause wear of the groove which shall leave it without a cross-section closely fitting the work's periphery, I provide for reversing the direction of the work-holder, as each time a fresh piece of work is presented.

The wheel 4, since it may be adapted to perform a polishing or other operation as well as a grinding operation on the work, is referred to in the appended claims as an operating wheel. Provision for operating on two pieces of work at a time are shown by Fig. 2, and in one of the units shown the wheel may be a grinding wheel and in the other a polishing wheel.

As the wheel wears away and when a fresh wheel is introduced necessary adjustment is effected between the slide 45 and carriage 16 by varying the lengths of the connecting chains.

Instead of shifting the work-holder toward the wheel in a plane parallel with the blank A, which tends to displace the work thereon, or in a direction perpendicular to said plane which produces undue clamping of the work between the wheel and work-holder, the work-holder in the present case is shifted in the direction of a radius of the wheel extending through the bevel being formed.

Having thus fully described my invention what I claim and desire to secure by Letters Patent is:

1. In combination, a rotated operating wheel, a supporting structure, work-holding means guided in said structure for movement toward and from the wheel, means constantly urging the work-holding means toward the wheel, and automatic means to move the work-holding means from the wheel and hold it withdrawn therefrom.

2. In combination, a rotated operating wheel, a supporting structure, work-holding means guided in said structure for movement toward and from the wheel, means constantly urging the work-holding means toward the wheel, automatic means to move the work-holding means from the wheel and hold it withdrawn therefrom, and manual means to cause the automatic means to release the withdrawn work-holding means.

3. In combination, a rotated operating wheel, a supporting structure, work-holding means guided in said structure for movement toward and from the wheel, means constantly urging the work-holding means toward the wheel, automatic means to move the work-holding means from the wheel and hold it withdrawn therefrom, and means to limit the movement of the work-holding means toward the wheel.

4. In combination, a rotated operating wheel, a supporting structure, a back-and-forth-movable system including work-holding means guided in said structure for movement toward and from and normally urged toward the wheel, automatic means, operative upon movement of said system in the direction to bring the work-holding means toward the wheel, to move said system in the relatively opposite direction, and releasable means to thereupon lock said system against return movement.

5. In combination, a rotated operating wheel, a supporting structure, work-holding means guided in said structure for movement toward and from and normally urged toward the wheel, a back-and-forth-moved member adapted when moving in one direction to withdraw the holding means from the wheel, means to move said member back and forth, and a connection between said member and holding means for transmitting withdrawing movement to the latter from the former, said connection permitting lost motion of said member with respect to the holding means when said member moves in the other direction and upon contact of the work with the wheel.

6. In combination, a rotating operating wheel, a supporting structure, work-holding means arranged to reciprocate in said structure toward and from the wheel, means constantly urging the work-holding means toward the wheel, a constantly reciprocating means adapted when moving in one direction to cause withdrawing movement of the work-holding means from the wheel, and a connection to transmit such withdrawing movement from said reciprocating means to the work-holding means when the former moves in said direction, said connection being adapted to yield on contact of the work with the wheel while said member is moving in the other direction.

7. In combination, a rotated operating wheel, rotating in an upright plane, supporting means including an up-and-down-extending guideway, work-holding means including a carriage movable up and down along the guideway, a weight, and a flexible connection connecting the carriage and weight and guided over a part of said structure above the carriage, the weight normally urging the carriage against the wheel.

8. In combination, a rotated operating wheel having a peripheral working surface, means to support the work including a work-holder, a guideway for said means extending transversely of the axis of the wheel and along which said means is movable to bring the work against said surface and with reference to which the work-holder is adjustable to different inclinations, and supporting means for the guideway adjustable to support the same in different planes angularly related to each other and bisecting a circle whose center coincides with said axis.

9. In combination, a rotated operating wheel having a peripheral working surface, means to support the work including a work-holder, a guideway for said means extending transversely of the axis of the wheel and along which said means is movable to bring the work against said surface and with reference to which the work-holder is adjustable to different inclinations, and supporting means for the guideway adjustable to support the same in different planes angularly related to each other and coinciding with chords of a circle whose center coincides with said axis.

10. In a beveling machine, a rotated operating wheel having a peripheral working surface, a supporting means including a guideway extending transversely of the axis of the wheel, a carriage movable along the guideway to bring the work against said surface, and a work-holder adjustable in the carriage around an axis substantially parallel with that of the wheel to different inclinations with reference to said guideway.

11. In combination, a rotated operating wheel having a peripheral working surface, supporting means, a work-holder revoluble in the supporting means on an axis coinciding with a chord of a circle having the wheel's axis as its center, and means to rotate the work-holder first in one direction and then in the other.

12. In combination, a rotated operating wheel having a peripheral working surface, supporting means, work-holding means movable back and forth on the supporting means, in one direction to bring the work against the wheel, said work-holding means including a work-holder revoluble on an axis crossing the wheel's axis, constantly going means, reversible rotary transmitting means connecting the going means and work-holder, means, operatively connected with and actuable by the going means, to move the work-holding means back and forth, and means to cause reversal of the rotary transmitting means on each back and forth movement of the work-holding means.

13. Apparatus for beveling including a rotated operating wheel, supporting means, and work-holding means guided in the supporting means and adapted to support the work in a plane substantially parallel with the axis of the wheel and with the portion thereof to be beveled presented to the wheel, said work-holder being guided in the supporting means to move toward the wheel to press the work against the wheel in the direction of a radius of the latter extending through the bevel being formed.

In testimony whereof I affix my signature.

BERTRAND E. BEYER.